Patented Jan. 6, 1925.

1,521,784

UNITED STATES PATENT OFFICE.

ARTHUR M. MITCHELL, OF WASHINGTON, CONNECTICUT.

METHOD OF PRESERVING CHEESE CURD.

No Drawing. Application filed March 3, 1924. Serial No. 696,684.

*To all whom it may concern:*

Be it known that I, ARTHUR M. MITCHELL, a citizen of the United States, residing at Washington, Litchfield County, State of Connecticut, have invented certain new and useful Improvements in Methods of Preserving Cheese Curd; and I do declare the following to be a full, clear, and exact description of the invention, such as will enable others skilled in the art to which it appertains to make and use the same.

This invention relates to the method of preserving cheese curd for use as food for chicks or mature chickens. There are two seasons which a dairyman recognizes so far as milk product is concerned, namely, a flush season, when the milk is plenty and there is an abundance of skim milk, and a dry season when the milk is not abundant and when skim milk is not available because the entire milk product must be used for the purposes of human consumption.

The flush season extends from November to June, while the dry season extends from June to November, during which latter period pasturage generally dries up and becomes burned to the extent that the milk product is comparatively meager.

The particular object of the present invention is to utilize the skim milk during the flush season so that it will be available for the purpose of making the food from June to November.

In practicing this invention, a cheese curd is first made from the skim milk, and this curd is then packed in casks or other similar receptacles, and a suitable liquid is then poured over the contents of the cask and permeates the curd and seals the latter as against the air.

The cask or receptacle is then sealed up, and the curd contents will keep almost indefinitely.

The liquid that is poured on the curd may be the whey resultant from the curd, or, in fact, may be any liquid or mixture of liquids which will destroy all bacterial growth of an injurious nature.

It is preferred to use the whey since it not only keeps the air from the curd but it also forms a good medium for lactic acid bacterial growth, so that the curd is really preserved in lactic acid bacterial growth, and this bacteria is so strong that it destroys other bacteria and finally gets to such a strength that it is self destroying, that is to say, this lactic acid bacteria only works so far and then stops and the dormant bacteria is highly beneficial to the resultant feed.

But the same results may be accomplished by substituting for the whey a water and formaldehyde mixture which latter likewise acts to destroy all injurious bacterial growth.

What is claimed is:—

The hereindescribed method of making feed for chickens or poultry, which consists in making cheese curd from skim milk, placing the curd in a receptacle and sealing the same by the resultant whey.

In testimony whereof I affix my signature hereto.

ARTHUR M. MITCHELL.